No. 866,862. PATENTED SEPT. 24, 1907.
W. C. HOOKER.
TRAP.
APPLICATION FILED FEB. 27, 1907.
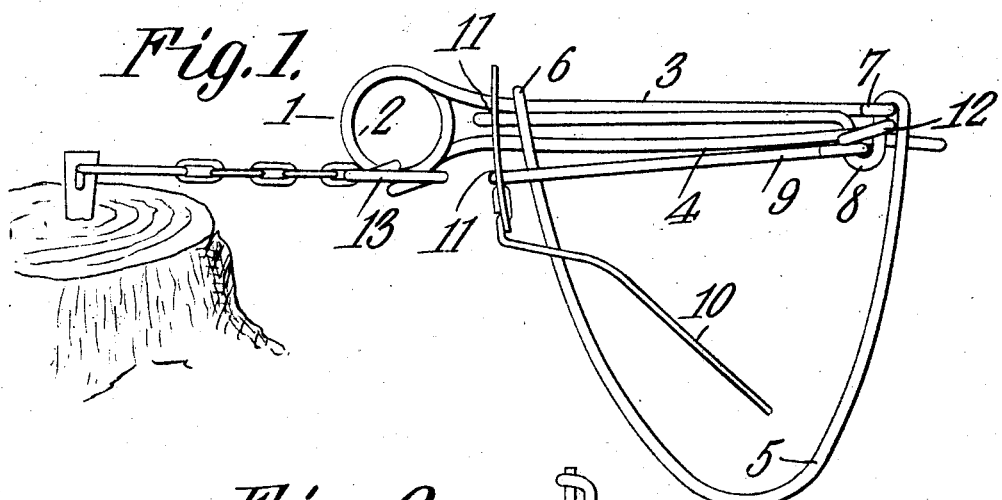
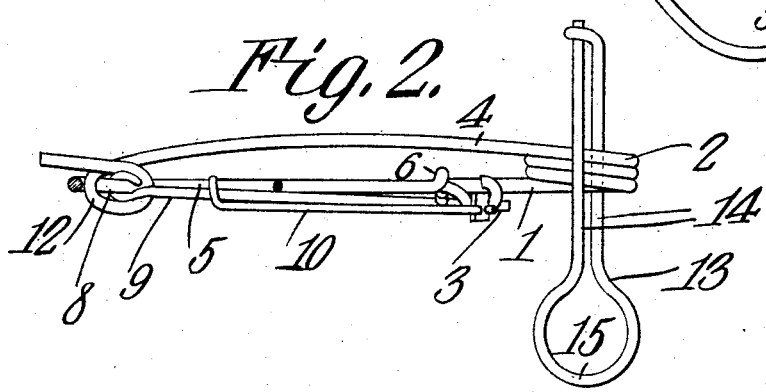
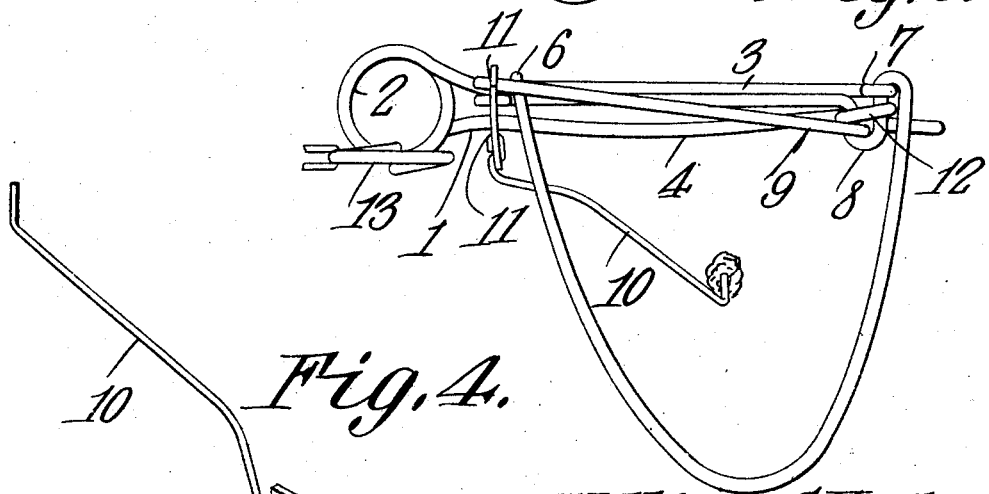
WITNESSES:
William C. Hooker,
INVENTOR.
By C. A. Snow & Co.
ATTORNEYS ns of the said bow in the form of a loop 8 to which is pivotally attached the end of the bar 9. The material of which the bow 5 is formed extends from the loop 8 along the end portion 3 and passes through the loop 6 and is provided at its end with the trigger 10. Said trigger 10 is pivotally attached to the said bow 5 and is provided upon opposite sides of its pivotal connection therewith with the openings 11 which are adapted to receive the end of the bar 9. The end 4 of the member 1 is provided with an eye 12 which passes along the bar 9. The end 4 of the member 1 may move along the side of the bow 5 when liberated as a result of the tension of the coil 2 of the member 1. The link 13 is provided with the substantially parallel end portions 14 and the intermediate portion 15. The chain 16 is attached to said link and in turn may be secured to a fixed object as is the usual practice with traps of this character. The link 13 passes through the coil 2 and by slipping the said coil between the parallel ends 14 of the said link, the said link will be disposed transversely with relation to the said coil and will form a base or support for maintaining the bar 5 in a substantially vertical or upright position.

UNITED STATES PATENT OFFICE.

WILLIAM CHAUNCEY HOOKER, OF ABINGDON, ILLINOIS.

TRAP.

No. 866,862.   Specification of Letters Patent.   Patented Sept. 24, 1907.

Application filed February 27, 1907. Serial No. 359,575.

*To all whom it may concern:*

Be it known that I, WILLIAM CHAUNCEY HOOKER, a citizen of the United States, residing at Abingdon, in the county of Knox and State of Illinois, have invented a new and useful Trap, of which the following is a specification.

This invention has relation to traps and it consists in the novel construction and arrangement of its parts as hereinafter shown and described.

The object of the invention is to provide a trap adapted to be used at runways or holes for entrapping animals that make use of such passages.

The trap consists primarily of a wire formed with a spring intermediate portion and extended ends, to one of which is attached a bow also of wire. A bar is pivotally connected to said bow in the vicinity of one of the ends of a spring member and passes through a loop provided in the other end of said spring member. A trigger is pivoted to the bow and is provided upon opposite sides of its pivotal point with openings for the reception of the end of the said bar. The trigger may be operated by the animal coming in contact with the same in passing through the runway or bait may be placed upon said trigger as a means for attracting the animal to engage in removing the same for liberating the bar which will permit one of the ends of the spring members to fly transversely across the bow and catch and retain the animal. The tension of the spring member is of such intensity as to immediately kill the animal and thus relieve the same of unnecessary suffering as a result of being entrapped.

In the accompanying drawing:—Figure 1 is a side elevation of the trap with parts set as a trip trap. Fig. 2 is a bottom plan view of the same. Fig. 3 is a side elevation of the trap with parts set as a bait trap, and Fig. 4 is a detail perspective view of the trigger of the trap.

The trap comprises the member 1 made of spring wire which is provided at an intermediate point with the coiled portion 2 and which is also provided with the end portion 3 and 4. The bow 5 is also made of wire and is secured to the end 3 of the member 1. Said bow is provided at one end with a loop 6 which surrounds the end portion 3 in the vicinity of the coil 2 of the member 1. The said bow 5 then extends away from the end 3 and returns to the outer end thereof and passes through the eye 7 formed at the outer end of the said end 3. The material of which the bow 5 is composed is then carried in between the ends of the said bow in the form of a loop 8 to which is pivotally attached the end of the bar 9. The material of which the bow 5 is formed extends from the loop 8 along the end portion 3 and passes through the loop 6 and is provided at its end with the trigger 10. Said trigger 10 is pivotally attached to the said bow 5 and is provided upon opposite sides of its pivotal connection therewith with the openings 11 which are adapted to receive the end of the bar 9. The end 4 of the member 1 is provided with an eye 12 which passes along the bar 9. The end 4 of the member 1 may move along the side of the bow 5 when liberated as a result of the tension of the coil 2 of the member 1. The link 13 is provided with the substantially parallel end portions 14 and the intermediate portion 15. The chain 16 is attached to said link and in turn may be secured to a fixed object as is the usual practice with traps of this character. The link 13 passes through the coil 2 and by slipping the said coil between the parallel ends 14 of the said link, the said link will be disposed transversely with relation to the said coil and will form a base or support for maintaining the bar 5 in a substantially vertical or upright position.

In practice the bow 5 is placed about the walls or end of the runway or hole through which the animal passes. The end of the bar 9 is inserted in the nearer opening 11 of the trigger 10. In order to do this it is necessary to force the end 4 of the member 1 toward the end 3 thereof so that the loop 8 will lie within the loop 12 of the said end 4 and the free end of the bar 9 may swing toward the trigger 10. As the animal passes through the runway its body brushes against the free end of the trigger 10 which moves the same and releases the end of the bar 9 from the opening 11. The tension of the spring 2 then comes into play and both the bar 9 and the end 4 of the member 1 sweep along the side of the bow 5 and the animal is caught and retained by the said parts within the said bow.

When it is desired to use bait for luring the animal the end of the bar 9 is placed in the perforation 11 at the opposite side of the pivotal point of the trigger 10. Thus, in order to reach the bait the animal passes its head through the bow and in attempting to draw the bait down swings the trigger which releases the bar 9 with the result above described.

Having described my invention what I claim as new and desire to secure by Letters-Patent is:—

1. A trap comprising a spring member having extending ends, a bow attached to one of said ends, a bar pivoted to said bow and engaging the other end of the spring member, a trigger pivoted to said bow and having upon opposite sides of its pivotal point openings for the reception of said bar.

2. A trap comprising a spring member having a coiled intermediate portion with extended ends, a bow attached to one of said ends and bearing against the other end, a bar attached to said bow and engaging the last named end of the spring member, a trigger attached to the bow and having an opening for the reception of said bar, a link passing through the coiled portion of said member and having parallel portions which are adapted to receive between them the coiled portion of said member whereby the said link will be disposed transversely with relation to said coiled portion of the member.

In testimony that I claim the foregoing as my own, I have hereto affixed my signature in the presence of two witnesses.

WILLIAM CHAUNCEY HOOKER.

Witnesses:
 CHAS. VICE,
 J. B. REYNOLDS.